Figure 4:
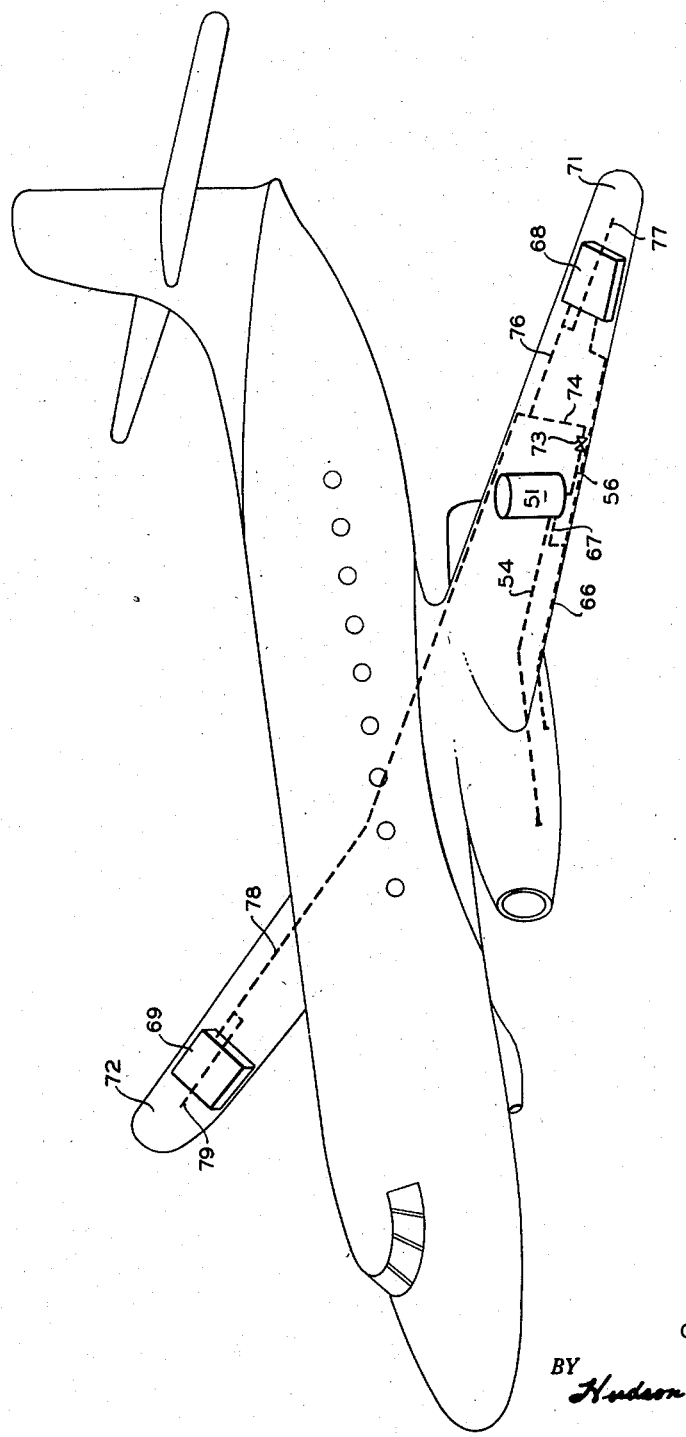

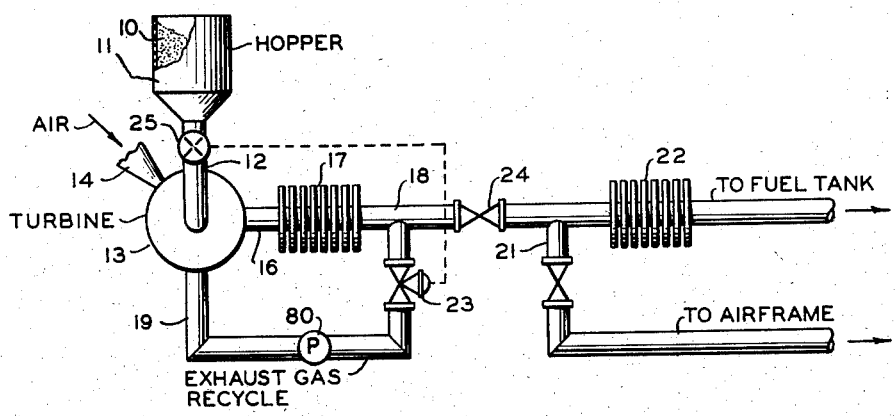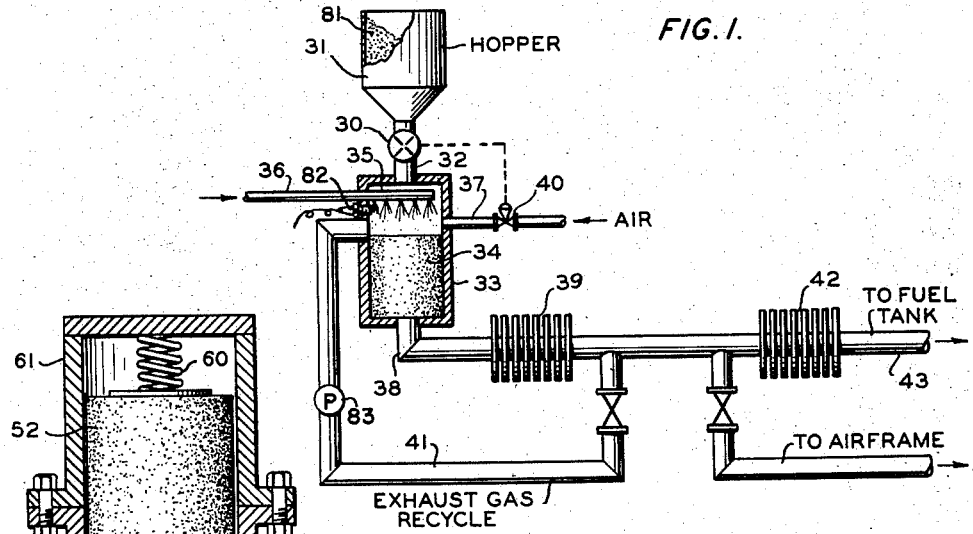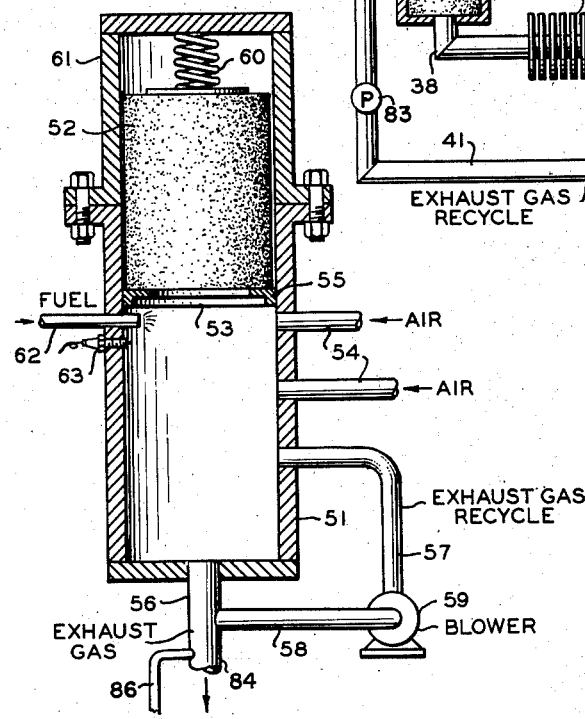

Sept. 13, 1960      O. C. BRIDGEMAN      2,952,428
METHOD AND APPARATUS FOR SUPPLYING INERT GASES
TO SPACES IN AIRCRAFT WHILE IN FLIGHT
Filed April 19, 1954      2 Sheets-Sheet 2

INVENTOR.
O. C. BRIDGEMAN
BY Hudson and Young
ATTORNEYS

United States Patent Office 2,952,428
Patented Sept. 13, 1960

2,952,428

METHOD AND APPARATUS FOR SUPPLYING INERT GASES TO SPACES IN AIRCRAFT WHILE IN FLIGHT

Oscar C. Bridgeman, Bartlesville, Okla., assignor to Phillips Petroleum Company, a corporation of Delaware Filed Apr. 19, 1954, Ser. No. 424,091

5 Claims. (Cl. 244—135)

This invention relates to the operation of aircraft. In one of its more specific aspects, it relates to a method of operating aircraft wherein a substantially anhydrous inert gas high in nitrogen content is supplied to the fuel tanks and air frame of the aircraft in order to prevent the accumulation and formation of explosive mixtures therein. In another of its more specific aspects, it relates to a method of pressurizing the fuel tanks and air frame of aircraft during flight in order to prevent explosion and implosion hazards.

This application is a continuation-in-part of my copending U.S. application Serial No. 238,350, filed July 24, 1951, now abandoned.

During the operation of aircraft, explosive fuel-air mixtures tend to accumulate or form in the fuel tanks and in the air frame of the aircraft. When such a combustible mixture is formed, a very dangerous condition exists, for internally caused static electricity, a chance spark, or, in the case of military aircraft, an incendiary projectile or fragment may set off an explosion within these confined areas. For a number of years, considerable attention has been paid to this problem, but up to the present time no completely satisfactory solution has been advanced. With the development of improved types of aircraft with the passage of time, speeds of operation have increased and the need for an economic and operable pressurizing and purging system has become increasingly acute. Various methods have been proposed for purging aircraft fuel tanks, but such methods have one or more disadvantages which render them unsuitable for application to aircraft.

The solution to the problem is rendered more difficult by the very fact that aircraft are involved. While a certain purging and pressurizing system might be entirely satisfactory for a surface installation, the very same system would be entirely unsuitable for use in conjunction with aircraft. In order to provide a satisfactory purging and pressurizing system for the fuel tanks and air frame of aircraft, several limiting factors must be taken into consideration. In the design and construction of aircraft, weight is an important limiting factor, and any installation which unnecessarily adds weight to the aircraft is unsatisfactory. Accordingly, the purge system must possess a high weight efficiency which is obtained in a manner more fully described hereinafter. Another factor to be considered is the comparative solubility of the inerting gas in the aircraft fuel. If a gas is utilized which is comparatively soluble in the aircraft fuel, vapor lock may result, causing improper engine performance. Still again, it is important that the inerting gas utilized be low in water content in order to ensure free flow of fuel through the fuel system. Yet another factor relates to the oxygen and hydrogen content of the inerting gas. It is important that the oxygen and hydrogen content be maintained at a minimum.

One of the conventional methods for inerting the fuel tanks of aircraft involves the introduction of carbon dioxide in order to dilute the vapors sufficiently to render them non-explosive. Another method which has been suggested employs engine exhaust gas to purge the fuel tanks and wing structure. None of these methods, as further discussed below, satisfactorily fulfill the rigid requirements which must be met in order to remove the hazardous conditions incident to the accumulation and formation of explosive fuel-air mixtures in the fuel tanks and air frame of aircraft.

With respect to the employment of relatively pure carbon dioxide as an inerting gas, at least two difficulties become immediately apparent. Firstly, there is the great bulk and weight of the cylinders which would be required in order to carry the large amount of carbon dioxide necessary for adequate purging. Secondly, carbon dioxide has a comparatively high solubility in the hydrocarbon fuel. The presence of dissolved carbon dioxide in the fuel results in vapor lock, engine surging and engine roughness under certain operating conditions.

The utilization of engine exhaust gas as a purge gas presents still other disadvantages. The exhaust gases from both jet engines and reciprocating engines contain a large amount, generally about 20 percent by volume, of water vapor. If such an exhaust gas is employed as a purge gas, the water vapor may condense and freeze in the fuel tank vents and in the internal wing structures. Further, the water vapor may condense in the fuel itself, causing fuel filter clogging and poor engine performance. These particular difficulties cannot be completely avoided by the use of condensers or similar devices. The exhaust gas will also contain products of partial combustion which are corrosive, and when aviation gasoline is used as the fuel, harmful halogen compounds will be present.

Furthermore, while it is relatively simple to withdraw engine exhaust gas having a comparatively uniform composition from a reciprocating engine, the problem is much more complicated in the case of jet engines. Instability of the flame front and displacement of the combustion zone under the varying operating conditions result in wide variations in the composition of the exhaust gas, particularly with regard to the oxygen content. In extreme cases, it is not inconceivable that essentially pure air would be withdrawn as a purge gas.

Another problem in aircraft operation, which is related to that discussed above in that the fuel tanks and air frame of the aircraft are concerned, is concerned with the pressurizing of these spaces under certain conditions of operation. When aircraft make a rapid change from a high to a low altitude, as for example in making a power dive, an implosion hazard exists with relation to the enclosed spaces of the aircraft because of the sudden increase in external pressure. It is important, therefore, that the pressure differential, i.e., the difference between the internal space pressure and the external atmospheric pressure be maintained at a minimum during a sudden change in altitude. Preferably, the fuel tanks and air frame should be pressurized during a diving operation so that the internal pressure is at all times substantially equal to the external pressure. In accordance with the present invention, a method for purging and pressurizing the fuel tanks and air frame of aircraft is provided which overcomes the many disadvantages inherent in the presently known methods.

The following objects of the invention will be attained by the various aspects of the invention.

It is an object of this invention to provide an improved method for operating aircraft.

Another object of the invention is to provide a method for operating aircraft wherein a substantially anhydrous inert gas high in nitrogen content is supplied to the fuel tanks and air frame of the aircraft in flight in order to prevent the accumulation and formation of explosive mixtures therein.

Still another object of the invention is to provide a method for pressurizing the fuel tanks and air frame of aircraft during sudden changes from high to low altitudes in order to eliminate implosion hazards.

Yet another object of the invention is to provide for aircraft a purge and pressurizing system which has a high weight efficiency.

A further object of the invention is to provide a method for producing a substantially anhydrous purge gas having a high nitrogen content.

A still further object of the invention is to provide a method for de-oxidizing air for subsequent use in the purging and pressurizing of the fuel tanks and air frame of aircraft.

Yet a further object of the invention is to provide an improved method for catalytically promoting burning of the substantially pure carbon utilized in the production of the inerting gas.

Other and further objects of the invention will become apparent to one skilled in the art upon consideration of the following disclosure.

Broadly speaking, the present invention resides in a method for operating aircraft wherein substantially pure carbon is burned with air so as to produce an inert gas having a high nitrogen content, i.e., about 80 percent by volume. The inert gas is thereafter passed to the fuel tanks and air frame of the aircraft in order to prevent the accumulation and formation of explosive fuel-air mixtures therein. In a preferred modification of the invention, the inert gas so produced is supplied to the fuel tank and air frame of the aircraft during sudden changes from high to low altitudes in order to pressurize these spaces and thereby eliminate the hazard of implosion.

The amount of air utilized in carrying out the method of this invention is preferably such that complete combustion is obtained without substantial residual oxygen being present in the combustion products. The combustion gas thereby obtained comprises essentially nitrogen and carbon dioxide. In another preferred modification of the invention, an oxidation catalyst is utilized to promote conversion of carbon monoxide to carbon dioxide.

The carbon used in the invention has a negligible ash content being below about 1.0 percent by weight and preferably below about 0.25 and 0.1 percent by weight. The utilization of a carbon having a negligible ash content is of primary importance, for the use of such material makes possible a substantial saving in weight. The high weight efficiency of the purge and pressurizing system of the invention is primarily dependent upon the use of such a material, and it is the high weight efficiency of the system which renders it especially adaptable for employment in aircraft. The amount of chemically combined hydrogen associated therewith is negligible so that the water content of the combustion gases is negligible, being less than 5 percent by volume and preferably less than about 1.0 to 0.5 percent by volume. Substantially pure carbons which meet these requirements and which may be used in the practice of the invention include carbon black and petroleum coke or mixtures thereof. These materials possess the very desirable property of low ash content and provide combustion gases having a low water content. The carbon to be employed may be in any suitable form or shape such as a finely divided powder or in the form of pellets, briquettes, block, etc.

The combustion gases formed by the method of this invention have a low oxygen content. In most cases, a satisfactory purge gas is produced when the oxygen content of the purge gas is about 10 percent by volume or lower. The combustion gas produced by this invention for use as a purge gas, however, preferably contains less than about 5 percent by volume, and more desirably below about 0.5 percent by volume of oxygen.

A more complete understanding of the invention may be obtained by reference to the following description and the drawing, in which:

Figures 1, 2, and 3 are, respectively, diagrammatic representations of a gas turbine, a surface combustion furnace and a solid combustion furnace, suitable for use in the practice of the present invention, and Figure 4 is a diagrammatic representation of a turbojet aircraft illustrating the present invention.

Referring to the drawing and in particular to Figure 1, a gas turbine is diagrammatically illustrated and is one type of apparatus which may be used to produce the purge gas of this invention. Substantially pure carbon 10 such as carbon black or pulverized petroleum coke is fed from hopper 11 through conduit 12 into combustion zone 13 of the gas turbine. The carbon black is supplied to the combustion zone at such a rate as may be required for the production of a desired amount of purge gas. Air is supplied to the combustion zone by means of conduit 14. Various gas turbines, well known in the art, may be adapted for the production of the purge gas of this invention and the power developed may be used for other purposes.

As shown in Figure 1, combustion gases are removed from the combustion zone through conduit 16 and thereafter are passed into cooler 17 which is preferably an air fin cooler. The gases are removed from cooler 17 through conduit 18. A portion of the cooled combustion gases, which may contain a certain amount of oxygen depending upon the operation of the combustion zone, may be recycled to the combustion zone by pump 80 through conduit 19 in order to effect further deoxidation of the gases and in order to control the temperature within the combustion zone. The combustion gases may be passed as required from conduit 18 through conduit 21 to provide the desired purge gas for the air frame of an aircraft. The combustion gases in conduit 18 may be further cooled by passing same through cooler 22 prior to introduction into the fuel tanks of the aircraft.

In the operation of the apparatus of Figure 1, the required amount of air for combustion is introduced into the combustion zone 13 through line 14. The source of combustion air will be described more in detail in conjunction with Figure 4. The flow of recycle combustion gases in line 19 may be controlled by suitable control means such as flow control valve 23 responsive to the rate of feed to the combustion zone through valve means 25. A throttling valve 24 may advantageously be placed in conduit 18 downstream from conduit 19 for loading the turbine. Means for igniting the carbon black similar to that to be described hereinafter in conjunction with Figure 3 may be utilized with the apparatus of Figure 1.

Referring now to Figure 2, a surface combustion furnace is illustrated which may be used to produce the purge gas of the present invention. A substantially pure carbon 81 such as carbon black is passed into combustion zone 33 from hopper 31 by means of conduit 32. The combustion zone is preferably packed with suitable particulate refractory material 34 such as aluminum oxide or similar material. Combustion zone 33 may be provided with a suitable pilot to preheat the refractory material therein as by the admission of liquid fuel into the combustion zone through line 36 and distributor 35. Suitable ignition means such as a spark plug 82 is utilized to ignite the fuel introduced into the combustion zone through conduit 36. The pilot may also be advantageously used to ignite the carbon black. Air is supplied to the combustion zone through conduit 37 from a source to be described more in detail in relation to Figure 4. A rate control valve 40 may be inserted in air supply line 37 in order to control the rate of air supplied to the combustion zone. This control valve which my advantageously be connected to and controlled by an electrical circuit may also be used in connection with control valve 30, in order to control the rate of addition of carbon black to the combustion zone through conduit 32. The combustion gases removed from the combustion zone through line 38 are thereafter cooled in cooler 39. A part of these combustion gases may be recycled by pump 83 through conduit 41 to the combustion zone. Since it is desirable to maintain the temperature of the combustion zone at about 1500° F. or lower, the recycle gases aid in maintaining the desired combustion zone temperature. The recyle combustion gases further serve to control the composition of the combustion gases removed from the combustion zone through conduit 38 and supplied to the fuel tanks and air frame of the aircraft through line 43. The combustion gases may be cooled by passing them through cooler 42 prior to introduction into these spaces.

Referring to Figure 3, which illustrates another apparatus for producing the purge gas of this invention, a solid combustion furnace 51 has disposed in one end thereof a solid block of substantially pure carbon 52. Furnace 51 is provided with stopping and supporting means 55 upon which the block of carbon rests. The carbon block is maintained on stops 55 and supplied to furnace 51 by means of a resilient means 60 such as a spring operating on the upper end of block 52. Container 61 which encloses the upper portion of the carbon block may be an integral part of or attached to furnace 51. Carbon block 52 may be perforated and/or porous in order to promote uniform combustion on its surface 53 which is supported on stops 55. Air is introduced into the furnace through conduits 54 which may communicate with the furnace at a plurality of points as shown. It is also within the contemplation of the invention to replace conduits 54 with a suitable air distributing means located within furnace 51 in order to uniformly and effectively distribute the air to carry out the combustion of surface 53 of carbon block 52. A liquid fuel line 62 fitted with a suitable nozzle and an ignition means such as spark plug 63 provide means for igniting the carbon contained in furnace 51. It is also within the scope of the invention to employ other systems such as a cartridge type ignition system which comprises a plurality of cartridges. Similar ignition systems may be used with the apparatus of Figures 1 and 2. The combustion gases are removed from the furnace through conduit 56. If desired a portion of these combustion gases may be recycled to the furnace by means of blower 59 and lines 57 and 58 in order to maintain a desired temperature, preferably in the range of 1000 to 1200° F., within the furnace. The recycling of the combustion gases also serves to control the composition of the gases leaving the furnace. The combustion gases leaving the furnace through line 56 are thereafter supplied, either directly or after cooling through line 84, to the fuel tanks and through line 86 to the air frame of the aircraft.

In a preferred modification of the invention, an oxidation catalyst is admixed with the substantially pure carbon, such as carbon black or petroleum coke, which is burned to produce the purge gas of the invention. The oxidation catalyst so employed promotes uniform burning and reduces the temperature necessary to maintain combustion, thereby increasing the ease of operation and at the same time producing a purge gas at a relatively low temperature. Furthermore, by the utilization of an oxidation catalyst, the de-oxidation of the air may be more effectively and efficiently carried out. By operating in this manner, the weight efficiency of the purge system is substantially increased. It is desirable that the oxidation catalyst be relatively non-volatile and that it be effective in small amounts. Suitable oxidation catalysts are the oxides and salts of the various heavy metals such as copper, nickel, iron, cobalt, and the like. The oxidation catalyst may be used in small amounts of about 5 percent by weight of the carbon and preferably below about 1 to 0.5 percent by weight of the carbon. Examples of suitable oxidation catalysts are nickel oxide, nickel nitrate, iron sulfate, copper oxide, copper nitrate, and cobalt oxide.

Oxidation promoters may also be employed with the carbon. It is sometimes desirable to carry out the combustion of the carbon in the presence of such oxygen containing materials in order to supply at least a portion of the oxygen required for combustion and to promote the rate of combustion. Oxidation promoters which may be utilized include inorganic compounds such as alkali metal and alkali earth nitrates, chlorates, perchlorates, permanganates and the like.

Referring to Figure 4 of the drawing a turbojet aircraft is diagrammatically illustrated which includes an apparatus similar to that shown in Figure 3 disposed in the wing structure. Identical reference numerals have been utilized to indicate elements corresponding to those described in relation to the discussion of Figure 3. In order to simplify the drawing, recycle lines 57 and 58 of Figure 3 have been omitted, but it is to be understood that provisions for recycling combustion gases may be included. Furthermore, in the interest of clarity, numerous valves, pumps, vents, pressure gages and the like have been omitted, but their inclusion may be readily made by one skilled in the art. While a turbojet aircraft is illustrated, it is not intended that the invention should be limited to any particular type of aircraft.

In the installation shown, furnace 51 is preferably located adjacent one of the turbojet engines. When utilizing one furnace, it is desirable that it be located as close to the center of gravity of the plane as possible. It is also within the scope of the invention to provide more than one furnace in which case the additional furnace or furnaces may be advantageously located adjacent the other engines of the aircraft. Combustion air to furnace 51 is supplied through line 54 connected to the compressor of the turbojet engine. Line 56 may be provided with a suitable flow control means 73 such as a solenoid valve which may be controlled from the instrument panel of the aircraft. By utilizing combustion air provided by the compressor, it is possible to obtain air preheated to as high as 1000° F. and higher, thereby promoting combustion of the carbon black. Depending upon the type of aircraft, other sources of air are readily available. For example, with a reciprocating type of engine, air may be conveniently taken from the supercharger. Fuel to the furnace is supplied through line 67 connected to the main fuel line 66 leading to the turbojet engine. Line 67 may be provided with a suitable valve such as a solenoid valve which may also be controlled at the instrument panel of the aircraft. A means for igniting the liquid fuel, such as a spark plug which also may be provided with a suitable switch at the instrument panel for controlling flow of current thereto, is provided as shown in Figure 3. Fuel tanks 68 and 69 are disposed in the wings of the plane, and other spaces in the wing structure adjacent the fuel tanks are indicated by reference numerals 71 and 72. The structure of the fuel tanks may be such that the wing surfaces themselves form a part of the fuel tank. The fuel tanks and spaces 71 and 72 are provided with suitable venting means, not shown, which are well known in the art.

Line 74 connected to conduit 56 from furnace 51 is further connected to lines 76 and 78 which communicate with fuel tanks 68 and 69, respectively. Additional lines 77 and 79 lead from lines 76 and 78 to spaces 71 and 72. As illustrated, conduit 56 is provided with a suitable flow control means, such as a solenoid valve, which may be controlled at the instrument panel. The other lines leading from conduit 56 may also be provided with similar valves in order to provide means for selectively controlling the flow of purge gas to the fuel tanks and to spaces 71 and 72.

The carbon block contained within furnace 51 is ignited by supplying liquid fuel to the furnace through line 67 and igniting same by means of the spark plug. After the carbon block is ignited, the supply of liquid fuel to the furnace is terminated. Purge gas may now be supplied to the fuel tanks and spaces 71 and 72 by opening solenoid valve 73. The purge gas may be supplied to these spaces either continuously or intermittently in an amount sufficient to maintain an inert, non-oxidizing atmosphere therein. The generation of purge gas may be terminated at any time simply by cutting off the supply of combustion air to furnace 51.

With reference to the fuel tanks, it is preferred to supply a volume of purge gas corresponding to the volume of fuel withdrawn from the fuel tanks. In any case a sufficient volume of purge gas is supplied in order to displace from the fuel tanks any explosive mixture present therein. With reference to the supply of purge gas to the air frame, a purge gas is supplied to spaces 71 and 72 in an amount sufficient to prevent the accumulation and formation of explosive fuel-air mixtures therein. Such mixtures have been found to accumulate especially in spaces adjacent the fuel tanks because of leakage of vapors from these tanks. While, as illustrated, the purge gas is supplied to only two spaces in the wing structure, it is within the scope of the invention to furnish the gas to any part of the air frame. When supplying purge gas to a space in which explosive fuel air mixtures do not accumulate, the purge gas is used to pressurize the space as indicated below and the property of low oxygen content is unimportant. As indicated above, the entire operation may be controlled at the instrument panel of the aircraft. It is also within the scope of the invention to provide pressure measuring means which give a continuous indication of the pressure in any space.

In a preferred modification of the present invention, a purge gas is supplied to the fuel tanks and the air frame during rapid changes of the aircraft from high to low altitudes in order to eliminate implosion hazards. Such hazards exist primarily during power dives where the changes in altitude are very rapid. It is preferred to introduce the purge gas into the fuel tanks and air frame in such a manner that the pressure within these spaces is substantially equal to the pressure exerted thereon by the atmosphere. The purge gas stream generated by the apparatus has a pressure up to at least 15 pounds p.s.i.g. in order to provide for the pressurizing of the fuel tanks and air frame. By pressurizing the fuel tank and air frame in this manner, the hazards of implosion are substantially eliminated.

While the furnaces utilized in practicing the present invention have been described with a certain degree of particularity, it is not intended to limit the invention to any specific type of furnace. Accordingly, a fixed bed burner or a solid injection combustor may be utilized in practicing the invention. It is important, however, that the furnace be small and compact as shown herein in order that the weight of the aircraft may not be unduly increased.

A better understanding of the invention may be obtained by reference to the following illustrative example which is not intended to be unduly limitative of the invention.

For this example, a gas turbine similar to that shown in Figure 1 is installed in an aircraft in a manner similar to that illustrated in Figure 4. Carbon black is burned in the combustion zone of the turbine with 20 percent excess compressed air having a temperature of about 200° F., the compressed air being suplied by the compressor of the turbojet engine. The combustion gases in the combustion zone are diluted with a portion of the gases emerging from the turbine, which have been cooled in an air fin cooler to a temperature of about 575° F. The cooled diluent gases amount to about 2.3 mols per mol of the hot combustion gases, yielding a mixed gas temperature at the outlet of the combustion zone of about 1425° F. The gases are then passed to the turbine. The turbine exhaust gases are cooled in the air fin cooler to about 575° F. and about 70 percent of the gases are recycled to the combustion zone as previously described. The remaining 30 percent of the gases having an oxygen content of about 4 percent are passed to the fuel tanks and air frame of the aircraft. The portion of the gases passed to the fuel tank is cooled in a second air fin cooler prior to introduction thereinto.

It should be apparent from the above description that the purge gas utilized in practicing the instant invention possesses many properties which render it superior to the purge gases known in the art. More specifically, the purge gas is more satisfactory than pure carbon dioxide alone. For example, carbon dioxide is in a neighborhood from 8 to 16 times more soluble in hydrocarbons than is air. The carbon dioxide content of the inert purge gas of this invention exerts about one-fifth the partial pressure of that of an atmosphere of pure carbon dioxide. A great deal less carbon dioxide, therefore, dissolves in the fuel than would dissolve if pure carbon dioxide were employed as the purge gas. Accordingly, problems of vapor lock which may be caused by the presence of carbon dioxide are greatly minimized. Furthermore, relative to the added weight and bulk problem inherently associated with the purging of aircraft fuel tanks and wing structures, this invention provides an outstanding advantage. With regard to the amount of carbon required to be carried to produce a given amount of purge gas, the weight of carbon required is only about one-twentieth that of the weight of pure carbon dioxide required. Furthermore, the heavy metal containers necessary for holding the supply of pure carbon dioxide are eliminated. In accordance with the present invention, the carbon is carried as a compact package, and, when burned, utilization is made only of the ambient atmosphere, producing a purge gas comprising essentially carbon dioxide and nitrogen. The presence of a high percentage of nitrogen in the gas, preferably about 80 percent, is a distinct advantage since the nitrogen is substantially insoluble in the hydrocarbon fuel. Furthermore, the utilization of a gas from the atmosphere as a predominant proportion of the purge gas accounts primarily for the high weight efficiency of the system. Accordingly, it should be apparent that the purging and pressurizing system of this invention possesses a high weight efficiency which constitutes a distinct and important advantage when dealing with aircraft.

This invention provides numerous advantages over the use of an engine exhaust gas as a purge gas. As indicated hereinbefore, the water vapor present in an engine exhaust gas, as well as unburned fuel and other deleterious materials therein, give rise to many operating difficulties. All of these difficulties are avoided by employing a purge gas obtained in accordance with this invention. The greatest advantages obtained are the elimination of water vapor from the purge gas and a production of a purge gas of a uniform and desired composition free from deleterious materials.

Additional advantages accrue from the use of the purge gas of this invention because of its low oxygen and hydrogen content. The presence of oxygen and hydrogen in the fuel tanks may result in a portion thereof becoming dissolved in the fuel. In order to provide a stable fuel suitable for the handling it subsequently receives, it is important that the fuel contain substantially no dissolved oxygen and hydrogen. Accordingly, the purge gas of this invention possesses additional properties which render it superior to the purge gases conventionally used.

It will be apparent from the foregoing that I have achieved the objects of my invention in that I have provided an efficient and effective method for purging and pressurizing the fuel tanks and air frame of aircraft. By operating in the described manner, the many disadvantages inherent in conventional purge systems are overcome; the safety of operation of aircraft is thereby promoted.

As will be evident to those skilled in the art, various modifications of this invention may be made or followed in the light of the foregoing disclosure and description.

without departing from the spirit or scope of the disclosure.

I claim:

1. In the operation of aircraft under flying conditions, wherein fuel is withdrawn from storage tanks for supply to the aircraft engine, the improvement which comprises burning substantially pure carbon having an ash content below about 1 percent by weight containing admixed therewith between about 0.5 percent and 5 percent by weight of an oxidation catalyst with a controlled amount of air in a combustion zone; and passing a volume of the resulting combustion gas, consisting essentially of carbon dioxide and nitrogen, from said combustion zone to the air frame of said aircraft and a sufficient volume of said gas to the fuel tanks of said aircraft to displace explosive mixtures therefrom, said combustion gas having an oxygen content of less than 10 percent by volume and a water content less than 5 percent by volume.

2. The improvement according to claim 1 wherein said catalyst is nickel oxide.

3. The improvement according to claim 1 wherein said catalyst is iron oxide.

4. The improvement according to claim 1 wherein said catalyst is cobalt oxide.

5. In a system for purging and pressurizing the fuel tanks and air frame of aircraft, the combination of a furnace comprising an enclosed shell; stopping and support means attached to the walls of an intermediate portion of said shell; a block of substantially pure carbon positioned within an upper portion of said shell and resting upon said stopping and support means, the lower surface of said block being in communication with the lower portion of said shell; a resilient means positioned between the upper end of said shell and the upper end of said block; means for introducing a fuel into said shell below said stopping and support means; means for igniting said fuel; outlet conduit means for withdrawing combustion gas from a lower portion of said shell; first conduit means connected between said outlet conduit means and said shell below said stopping and support means; second conduit means connected to said outlet conduit means and leading to said fuel tanks of said aircraft; and third conduit means connected to said outlet conduit means and communicating with spaces in said air frame.

References Cited in the file of this patent
UNITED STATES PATENTS

| | | |
|---|---|---|
| 1,671,492 | Skinner | May 29, 1928 |
| 1,995,274 | Eversole | Mar. 19, 1935 |
| 2,049,987 | Willenborg | Aug. 4, 1936 |
| 2,207,724 | Diehl | July 16, 1940 |
| 2,278,204 | Lewis | Mar. 31, 1942 |
| 2,375,834 | Walker | May 15, 1945 |
| 2,404,418 | Walker | July 23, 1946 |
| 2,586,839 | Mapes | Feb. 26, 1952 |
| 2,623,721 | Harrington | Dec. 30, 1952 |
| 2,624,711 | Williamson | Jan. 6, 1953 |
| 2,625,298 | Healy et al. | Jan. 13, 1953 |
| 2,756,215 | Burgess | July 24, 1956 |